ROBERT S. PRILL
MARVIN MASEL
JOSEPH V. McKENNA
*INVENTORS*

BY George B. Oujevolk
ATTORNEY

ROBERT S. PRILL
MARVIN MASEL
JOSEPH V. McKENNA
INVENTORS

BY George B. Oujevolk

ATTORNEY

INVENTORS
ROBERT S. PRILL
MARVIN MASEL
JOSEPH V. McKENNA
BY George B. Oujevolk
ATTORNEY ROBERT S. PRILL
MARVIN MASEL
JOSEPH V. McKENNA
*INVENTORS*

BY George B. Oujevolk

ATTORNEY

ROBERT S. PRILL
MARVIN MASEL
JOSEPH V. McKENNA
*INVENTORS*
BY George B. Oujevolk
ATTORNEY

United States Patent Office 3,438,026
Patented Apr. 8, 1969

3,438,026
ANALOG TO DIGITAL CONVERTER

Robert S. Prill, Bloomfield, Marvin Masel, West Englewood, and Joseph V. McKenna, Clark, N.J., assignors to General Precision Inc., Little Falls, N.J., a corporation of Delaware Filed Apr. 15, 1966, Ser. No. 542,941
Int. Cl. H03k *13/04*
U.S. Cl. 340—347 8 Claims The present invention relates to the problem of converting analog angular functions as presented by resolvers and synchros to digital numbers representing the angular function, and more specifically to an analog to digital converter.

Many methods to do this conversion now exist. Some methods are slow, some fast, some methods convert the angle to tangential functions, other to the angle, etc. The analog to digital conversion herein described is considered fast in the state of the art, and it presents the angle in any digital format desired (binary, BCD, two complement, etc.).

Figure 1:
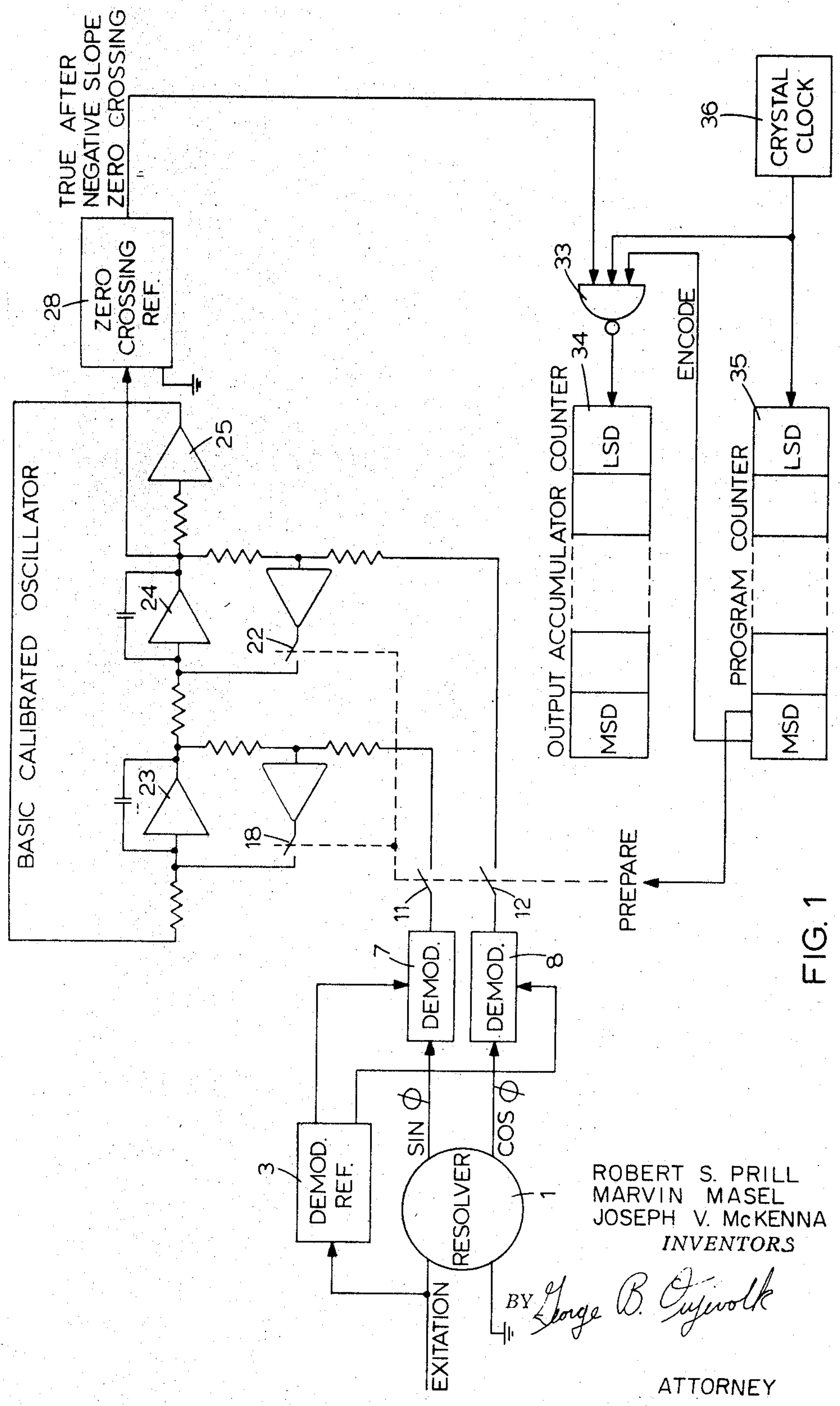
Figure 2A:
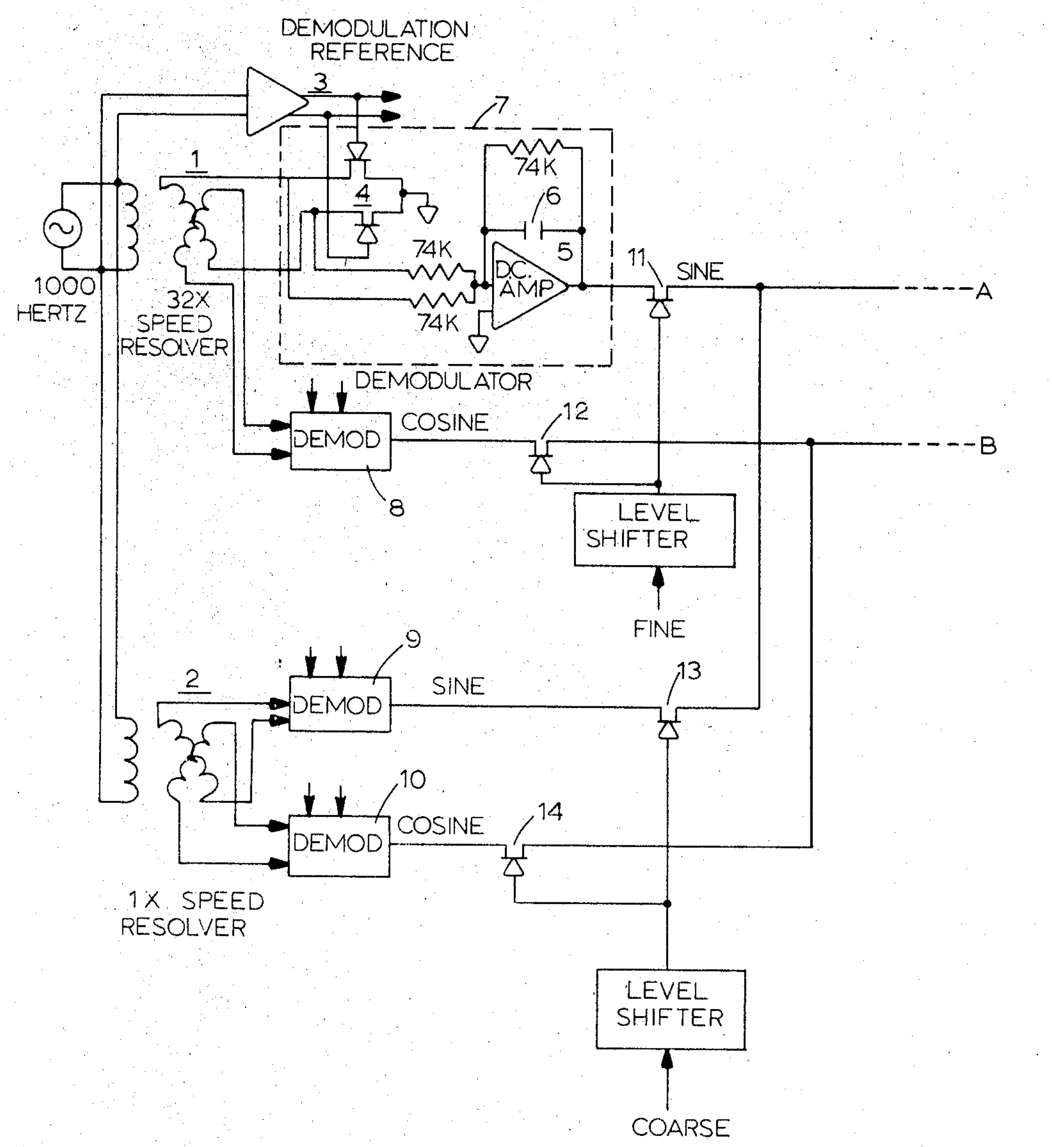
Figure 2B:
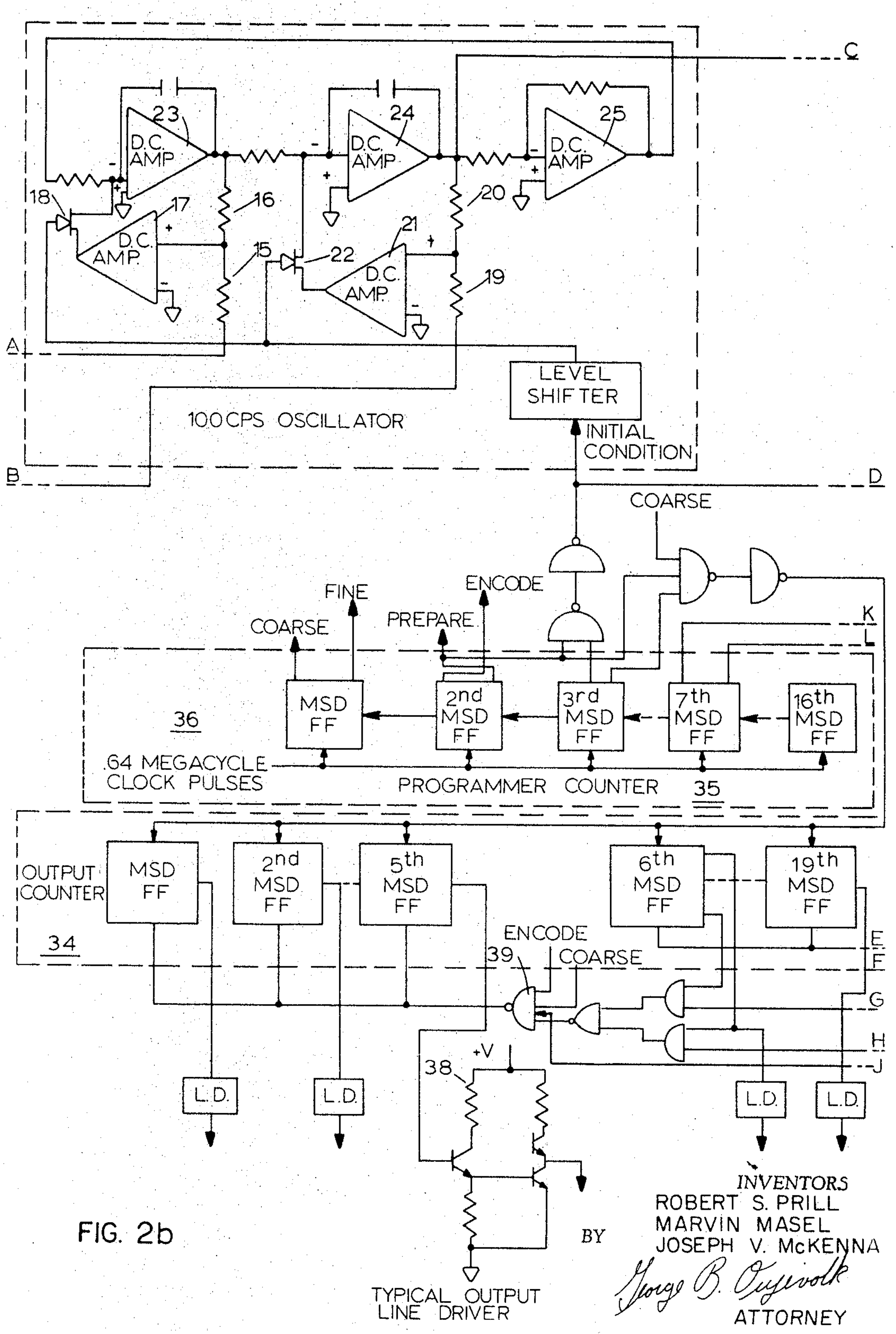
Figure 2C:
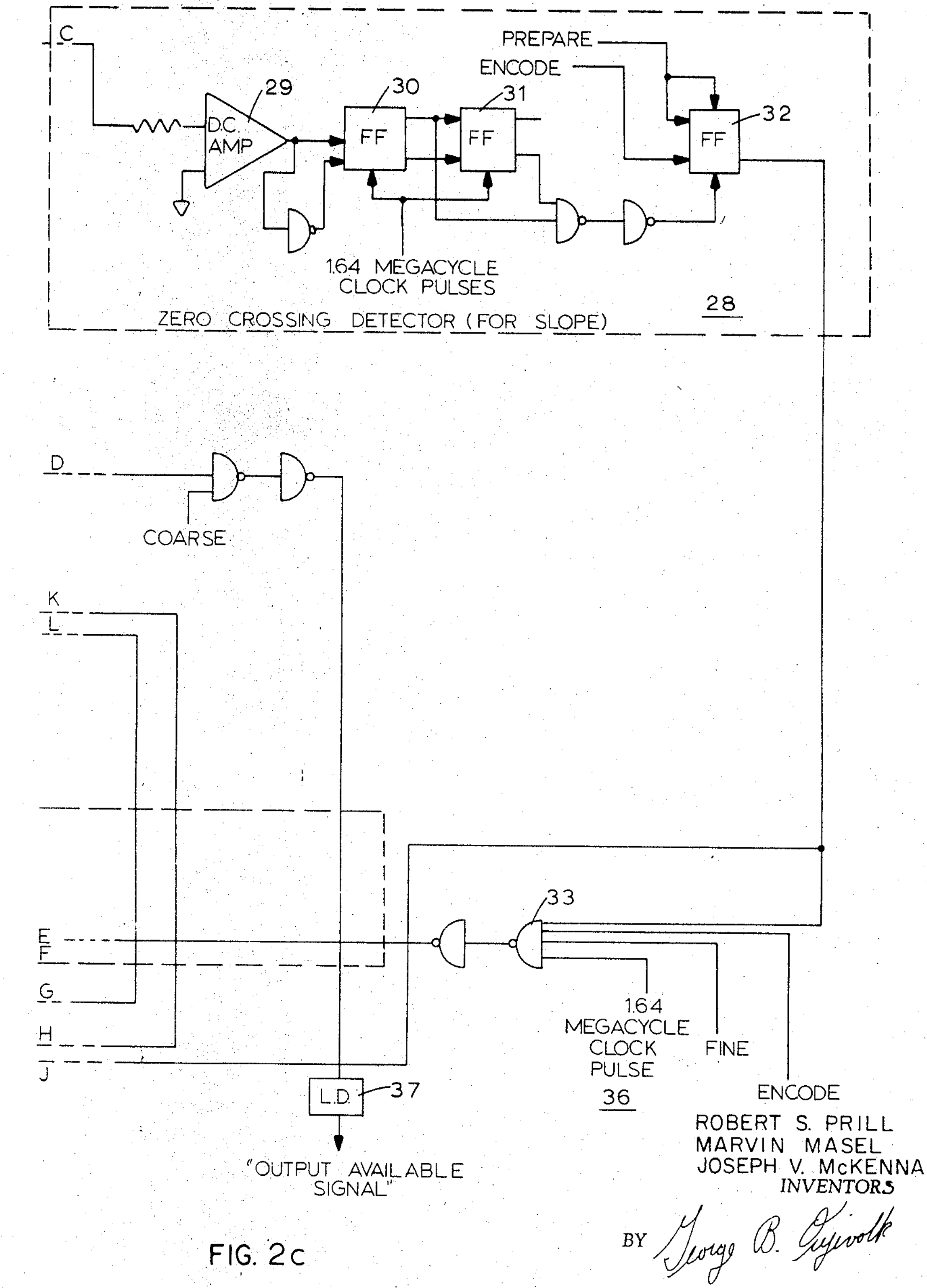
Figure 3:
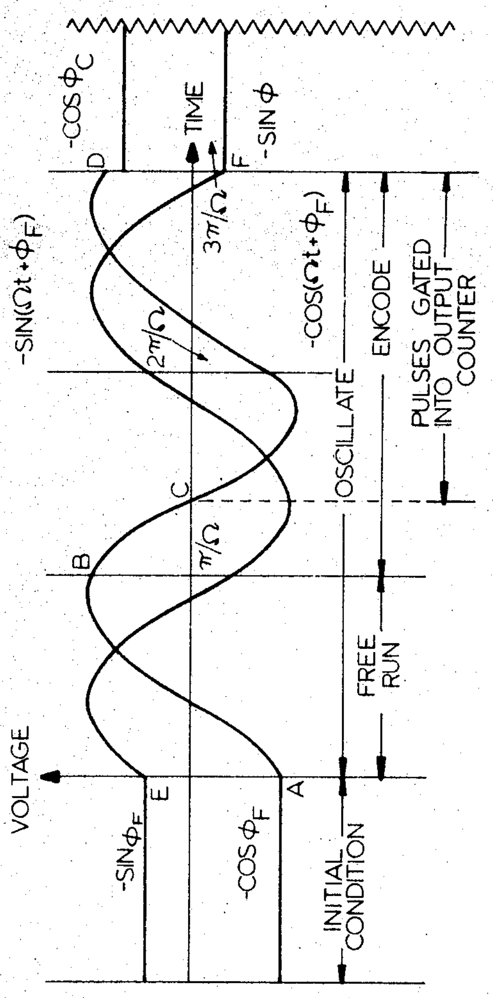

The invention as well as the objects and advantages thereof will be more readily understood from the following detailed description when viewed together with the accompanying drawings, in which FIGURE 1 represents a block diagram and some circuitry of the inventive concept;

FIGURES 2*a*, 2*b*, and 2*c* are a schematic diagram of the present invention; and FIGURE 3 depicts graphically the mathematical principles relating to the present invention.

The basic encoding scheme can best be explained with reference to these three basic diagrams.

Generally speaking, the device is preset so as to accommodate a cosine wave of 360 degrees. As this cosine wave crosses zero (in a predetermined direction), pulses are gated to an output counter. At will herein be shown, the pulse count thus provided is a digital representation of the angle value.

Considering first the system shown in block diagram, FIGURE 1, a resolver angular shaft position, is to be encoded as a digital number in an output accumulator counter 34. Two demodulators 7 and 8 with the aid of a demodulator reference 3 rectify and demodulate the resolvers sine and cosine inputs and thus convert the sinusoidal components of the resolver to D-C voltages. When all the switches shown in FIGURE 1 are closed the demodulated signals will be impressed on the basic oscillator, i.e., components 23, 24, 25. With the prepare signal, all switches open and the apparatus is in the encode mode. As soon as the switches open, the basic oscillator is isolated from the initial condition circuitry and therefore begins to oscillate. The zero crossing detector 28 detects when the cosine integrators output crosses zero with a negative slope. From the time of the zero crossing until the program counter 35 counts pulses to a full count (and again reverts to the prepare mode), pulses are accumulated in the output counter. These pulses represent the angle. If the frequency of the oscillator were adjusted such that the maximum number of clock pulses to enter the output counter were 3599, representing 359.9 degrees, the number in the accumulator will represent the angle to the nearest tenth of a degree.

A more detailed schematic is shown in FIGURE 2A. The principle of the system as described from this figure is to demodulate (and filter to a slight extent) the sine and cosine winding voltages of the resolver. The resulting polarity sensitive D-C voltages are used to clamp initial conditions on an oscillator. The oscillator is formed by placing two D-C integrators in series with an inverter, with feedback from the output of the inverter, to the input of the first integrator. The natural frequency of the oscillator is determined by the feedback resistors and capacitors of the oscillator and is completely independent of the resolver excitation carrier frequency. High stability resistors and capacitors, selected for zero temperature coefficient of resistance and capacitance product, are used. The oscillators natural frequency is trimmed during manufacture so that the proper number of clock pulses occur for each period.

When the oscillator is unclamped (by opening a field effect transistor switch in the feedback path of each integrator), a sine waveform illustrated in FIGURE 3, will appear at the output of the first integrator and a cosine waveform at the output of the second integrator. The oscillation is allowed to continue for precisely one and one half cycles. The zero-crossing detector enables an output connector to be clocked after the negative slope zero crossing of the cosine integrator. This occurs during the second or third half cycle of the oscillation. Any zero crossing occurring during the first half cycle of oscillation is ignored, because the unused first half cycle of oscillation is provided in the program counter to avoid encoding errors which might occur for small input angles. For example an input angle of $\frac{1}{10}$ degree, would have a zero crossing almost immediately after the onset of the oscillation. This would cause a small error since the cosine signal did not go through zero from a running start.

In the system shown in FIGURE 2A, a two speed resolver system, i.e., fine resolver 1 and coarse resolver 2 is to be encoded. The encoding process consists of first encoding the fine resolver 1 corresponding to the 19th through 6th MSD's (most significant digits) and then the coarse resolver 2, corresponding to the 5th through 1st MSD's. The digital method of combining the result of the two encodings shall be discussed later.

To encode the fine resolver using the embodiment shown in FIGURE 2A, we must first get D-C voltages proportional to the resolver angle. A resolver gives two A-C voltages representing the sine and cosine components of its angular shaft position. D-C signals representing the sine and cosine may be obtained by demodulating these A-C signals. The demodulation is accomplished by phase sensitive rectifying, and takes place in demodulators 7 and 8 during the fine encoding and in demodulators 9 and 10 in the coarse encoding.

Phase sensitive rectifying is accomplished by alternately opening and closing field effect switches 4 in synchronization with the resolver carrier frequency. Demodulation reference 3 provides synchronous switching commands to the four demodulators; and the typical unity gain amplifier 5 shunted by capacitors 6 performs the summing and filtering of the rectified resolver signals. (The amount of filtering necessary was found by experimentation to be quite small, a time constant of less than two carrier periods.)

The net result at the output of the demodulators is a D-C voltage of either plus or minus polarity proportional to the A-C input voltage. If the signal to the demodulator is in phase with the demodulator reference, the demodulators output will be plus, if the demodulators input signal is out of phase with the reference, the demodulators output will be minus.

The next step in the encoding process, as previously outlined, is to impose these D-C voltages representing the sine and cosine components of the fine resolver on the basic encoding oscillator, i.e., D-C integrators 23 and 24 and inverting D-C amplifier 25. To impose the demodulated resolver signals on the basic oscillator, as an initial condition at the proper time a program counter 35, clocked by a stable crystal clock 36, is decoded to close field effect transistor switches 11 and 12 when encoding the fine resolver, and switches 13 and 14 when encoding the coarse resolver. This allows the D-C voltages representing the sine and cosine resolver demodulated components to be gated through the respective input resistors 15 and 16, as one of the two inputs to D-C summary amplifiers 17 and 21. By closing switches 18 and 20 during the program period entitled, initial conditions, one closes the initial condition loop, which forces the outputs of D-C amplifiers 23 and 24 to the negative of their respective D-C input voltages representing the sine and cosine components of the resolver angle.

To emphasize this basic point, it is necessary to examine the sine integrator 23 and its associated initial condition mechanism consisting of resistors 15 and 16, the D-C amplifier 17, and the initial condition switch 18. When switch 18 is closed, low output impedance high gain D-C amplifier 17 will "pump" current into D-C amplifier 23 through switch 18 in a direction to force the D-C amplifier output voltage to be the negative of the associated sine demodulators output voltage. This is accomplished by summing the currents through precision resistors 15 and 16. When the currents are equal and opposite, the voltage at the output of the integrator 23 must be the exact opposite of the sine demodulators output. This balance occurs in a few microseconds.

The cosines initial conditions are simultaneously put on the cosine integrator by an analogous mechanism consisting of precision resistors 19 and 20, D-C amplifier 21, and switch 22.

Up to now there has been explained, in detail, how an electromechanical resolver's sine and cosine output signals are accepted, demodulated, and placed as initial conditions on the basic oscillator. It has also been shown that these initial conditions get inverted once and therefore actually represent minus (−) cosine $\phi$ and minus (−) sine $\phi$. However, the resolver angle must now be shifted through 180° to get the sine and cosine components in the proper quadrant, and then the angle must be encoded as a digital number.

During the initial condition period, as shown in FIGURE 3, the voltages on the sine and cosine integrators are D-C voltages, however, when switches 18 and 22 are opened, the demodulators initial conditions are removed from the basic oscillator, and it will begin to oscillate.

If the oscillator's natural frequency or period of oscillation is trimmed during testing such that the proper number of clock pulses, as counted in the program counter 35, occur for each period or cycle of oscillation of the oscillator, then an encoding mechanism exists. This can best be visualized and demonstrated graphically with a specific sample problem.

As has heretofore been pointed, and again with reference to FIGURE 3, during the initial condition period, the D-C voltages on the output of the sine and cosine integrators actually represent minus (−) the sine $\phi$ and minus (−) the cosine $\phi$ components of the resolver. It is therefore necessary to let the oscillator run free for a half cycle of oscillation, or 180° and the encode cycle begins. This accomplishes two things, first it rotates the sine and cosine components through 180° to agree with the actual resolvers components, and secondly it allows a free run period of the oscillator so that every encoding will be done on a dynamic basis.

At the end of the free run period, the voltage on the cosine integrators 24 is inspected in the zero crossing detector 28 and memorized in its flip-flops 30 and 31 as whether it was positive or negative at the beginning of the encode period.

No pulses are accumulated in the output counter until the cosine integrators output voltage during the encode period crosses a zero reference level with a negative slope. At this time the level detector flip-flop 32 qualifies a gate 33 to allow clock pulses to be accumulated in the output counter until the program register measures out an "encode period" of exactly one complete cycle of the oscillator. The oscillators period was previously calibrated to gate the proper number of clock pulses in one complete cycle of oscillation.

To intuitively satisfy one's self that a digital representation of the angle has been encoded, consider the specific problem in FIGURE 3 at the time the cosine integrators output is inspected. One should note that the sine voltage at this time is negative (a logical 0), and that the cosine voltage is positive (a logical 1), implying that the angular shaft position of the resolver represents an angle in the fourth quadrant. (See Truth Table I.)

TRUTH TABLE I

| Quad. | Sine | Cosine |
|---|---|---|
| I | 1 | 1 |
| II | 1 | 0 |
| III | 0 | 0 |
| IV | 0 | 1 |

Pulses are gated to the output counter for more than three quarters of the encode time, as shown in FIGURE 3. The digital count provided therefore depends on just where the cosine crosses zero. This count corresponds to the angle value.

With regard to the zero crossing detector logic 28, D-C amplifier 29 acts as a high gain inverting switch. It's function is to detect whether the cosine integrator's output is plus or minus with respect to ground. Flip-flops 30 and 31 store the polarity of the cosine integrator at the beginning of the encode period, and together with a little gating, provides the logic that detects the negative slope zero crossing that clocks flip-flop 32.

The logic is as follows:

TRUTH TABLE II

| | t prepare | tpsox +1 | tpsox +2 | tpsox +n | tnsox +1 | tnsox +2 |
|---|---|---|---|---|---|---|
| FF30 $\phi$ | 1 | 0 | 0 | 0 | 1 | 1 |
| FF31 $\phi$ | 0 | 0 | 1 | 1 | 1 | 0 |

where:

t prepare=time of initial inspection tpsox+1=time of positive slope zero crossing plus 1 clock time tnsox+1=time of negative slope zero crossing plus 1 clock time When $\overline{\phi}$ of flip-flop 32 gets clocked, high gate 33 or 37 become qualified depending on whether the fine or coarse resolver is being encoded. During the prepare period flip-flop 32 is always preset so that no clock pulses can be accumulated.

The method of combining "coarse" and "fine" resolver encodings is of interest. Referring to FIGURE 2, the 19-bit output counter 34 is initially cleared. In practice there is first an encoding of the "fine" resolved which uses the 19th through 6th most significant digits. The "coarse" encoding take place subsequently and uses the 5th through 1st most significant digits. To accommodate the smaller count on "coarse," the 5th through 1st MSD's are clocked by the 7th MSD flip-flop of the programmer counter 35. Ambiguities in the area of all "ones" (1111 . . . 1) to all "zeros" (0000 . . . 0) of the "fine" encoding are handled in a manner analogous to U-scan or V-scan switching of electromechanical shaft encoders; depending upon the state of the 6th MSD resulting from the "fine" encoding, the appropriate output of the 7th MSD flip-flop of the programmer counter is used as the clock for "coarse." An output available line driver is necessary to specify when both the fine and coarse resolvers have been encoded and combined. A typical discrete line driver 38 is shown, indicating that data output levels can be boosted to higher levels for better signal to noise ratio during transmission.

Immediately following the "coarse" encoding, the digital representation of shaft angle resides in the output counter for 25 milliseconds. An "output available" indicates that a valid reading exists.

It is instructive at this point to contrast the approach described with the traditional phase shift encoder. In the first place, it has been possible to set the oscillation frequency at a convenient value (e.g., 100 cycles) rather than being limited to the resolver carrier frequency (1000 cycles). This reduction in frequency permits use of a resonable clock rate (1.64 megacycle) and reduces the effect of small variations in the dynamic characteristics of the zero crossing detector. Secondly, harmonic distortion or variations in carrier frequency have virtually no effect. This insensitivity to carrier characteristics is extremely important because production of a distortion free, frequency stable resolver excitation voltage, at a fairly high power level, is likely to be more costly and complex than the encoder. A third, and very intersting feature of the arrangement described is that the encoding process may be clocked in synchronism with an external digital computer. When using a phase shift encoder (or transformer switching) the encoding process must generally be synchronous with the carrier frequency rather than a computer clock. This unfortunate synchronization condition results in a requirement for additional buffer storage and other complications.

In carrying the invention into practice, a device similar to that shown in FIGURE 2 was designed for a data annotation system with stress on very high encoding speeds. Readout was binary coded decimal rather than binary with resolution and accuracy of $\frac{1}{10}$ degree. The accuracy requirement was met with a conversion time of 1.2 milliseconds. The expectation of noncriticality of resolver excitation was fulfilled to a remarkable extent. Variation of resolver excitation amplitude by 40 percent or severe distortion (at least 40 percent harmonic content) of the excitation, also cause less than $\frac{1}{10}$ degree error.

The prototype built had two zero crossing detectors rather than one. The initial polarity of the sine and cosine was stored in flip-flops and decoded to provide quadrant information. The output counter had to be present to 00.0, 90.0, 180.0, or 270.0, depending upon the quadrant. In contrast to the situation previously described, the active portion of the oscillation was only one quarter cycle rather than one cycle so that an appreciable increase of speed was possible. The output counter was gated by either a positive or a negative zero crossing of either the sine or the cosine zero-crossing detector. It was possible to calibrate the difference in trigger voltages of the zero-crossing detector between the positive going and negative going directions. This was done by biasing the comparators in a manner depedent upon quadrant. (Two cycle errors of the resolver itself may also be calibrated by the same procedure in a nonmultiplexed situation.)

Reduction of active oscillation time to one-quarter cycle also reduces encoding errors caused by changes in the oscillator natural frequency or drift of the oscillator integrators or inverter. In the case of a one cycle oscillator, a one part in 3600 frequency error causes a $\frac{1}{10}$ degree encoding error for a 359.9 degree input, $\frac{1}{20}$ degree for a 180 degree input and 0 degree for a 0 degree input. For a ¼ cycle oscillator, the errors are reduced to $\frac{1}{40}$ degree for 359.9 degree $\frac{1}{80}$ degree for 315 degree, 0 degree for 270 degree, $\frac{1}{40}$ degree for 269.9 degree, etc. Similarly, errors due to amplifier drift are reduced since the drift is effective over a shorter time period.

The simpler single-comparator arrangement shown in FIGURE 2 was easier to understand, and preferably used in explaining the invention. Where high accuracy and speed are the prime requirements, rather than low cost, a dual comparator, ¼ cycle system is preferred in practice.

The full wave demodulator used in the prototype is shown in FIGURE 2. Field effect transistors (having virtually zero offset voltage and a maximum of 250 ohms "on" resistance) are used for switching. A demodulator filter time constant of two carrier periods is satisfactory. Using a 1 kilocycle carrier frequency, the dynamic error used by demodulator filtering is quite small, for example, about 15 seconds of arc at a 2 degree/second input rotation rate.

Transformation ratio differences between the sine and cosine windings of the resolver can be trimmed out by trimming the quadrants separately by biasing the comparators, indicates that a carefully designed device can encode a resolver angle with an accuracy superior to that of the resolver. This supposition was borne out in experiments on the prototype built which used a resolver of about 3-to-4-minute accuracy. It was possible to obtain the exact readout (to $\frac{1}{10}$ degree resolution) when the resolver was rotated from 0 degree to 355 degree in 5 degree steps.

The device can serve as a computer, as well as a synchro-to-digital converter, with a small increase in components. For example, one input resolver may be encoded in the normal manner to obtain a digital representation of angle in a counter. The signals from a second resolver may then be demodulated and the resulting D–C voltages placed as initial conditions on the oscillator. If the oscillator is permitted to oscillate only for the time required to count the angle register to zero and then stopped, the sine and cosine integrators will have output voltages proportional to the sine and cosine in a rotated coordinate system. If the two integrators are reset to zero by constant current sources of appropriate zero crossings. By such methods, the magnitude, as well as the angle, of an input resolver may be encoded.

It is to be observed therefore that the present invention provides for an analog to digital converter for converting sinusoidal angle functions presented by a synchro or resolver to a digital angle value, comprising in combination: demodulation means to convert the presented outputs into D-C voltage values; oscillation means responsive to impressed D-C inputs capable of at least one ¼ cycle of oscillation from said impressed inputs, including a circuit between said demodulation means and said oscillation means; switch means in said circuit which in one position will impress said demodulation means D-C voltage values on the oscillation means and which in the other position will start said oscillation cycle at said impressed voltage values; a zero crossing and phase detector connected to said oscillation means to detect a zero crossing in a particular phase of a selected one of said oscillation cycles; counter means responsive to said zero crossing detector including a pulse source for providing pulses, and accumulation means for accumulating the amount of pulses, said pulse source being gated to said accumulation means by said zero crossing, the counter means including a preset total, and the number of pulses provided between zero and said preset total depending upon the location of said detected zero crossing, said accumulated pulses corresponding to the desired angle value.

While the present invention has been described in a preferred embodiment, it will be obvious to those skilled in the art that various modifications can be made therein within the scope of the invention, and it is intended that the appended claims cover all such modifications.

What is claimed is:

1. An analog to digital converter for converting sinusoidal angle functions presented by a synchro or resolver to a digital angle value, comprising in combination: demodulation means to convert the presented outputs into D-C voltage values; oscillation means responsive to impressed D-C inputs including a circuit between said demodulation means and said oscillation means; switch means in said circuit which in one position will impress said demodulation means D-C voltage values on the oscillation means and which in the other position will start said oscillation cycle at said impressed voltage values; a zero crossing and phase detector connected to said oscillation means to detect a zero crossing in a particular phase of a selected one of said oscillation cycles; counter means responsive to said zero crossing detector including a pulse source for providing pulses and accumulation means for accumulating the amount of pulses, said pulse source being gated to said accumulation means by said zero crossing, the counter means including a preset total, and the number of pulses provided between zero and said preset total depending upon the location of said zero crossing, said accumulated pulses corresponding to the desired angle value.

2. A converter as claimed in claim 1, said oscillation means being capable of at least one ¼ cycle of oscillation.

3. A converter as claimed in claim 2, said oscillation means including at least a first integrator, including a capacitor having an input and output side, an amplifier connected from said output side to said input side, a second lead to said amplifier, a first balancing resistor between said integrator output side and said amplifier, a second balancing resistor in said second lead and, a first switch as part of said switch means between said amplifier and said integrator input side, one of said impressed voltages being fed to said amplifier across said second lead, charging said capacitor, the oscillation being started upon the opening of said switch.

4. A converter as claimed in claim 3, including a second integrator in series with said first integrator and a second amplifier between said second integrator output side and its input side as well as third and fourth balancing resistors for said second integrator and second amplifier corresponding to said first and second integrator and second amplifier corresponding to said first and second balancing resistors, with a similar second lead for said second amplifier, and a second switch similar to said first switch, one of said impressed voltages corresponding to one sinusoidal function being fed to one of said amplifiers, the second of said impressed voltages corresponding to the complementary sinusoidal function being fed to the second of said amplifiers.

5. A converter as claimed in claim 4, including an inverter in series with said second integrator output and a feedback loop from said inverter to the input side of said first integrator.

6. A converter as claimed in claim 4, including a fine channel and a coarse channel and circuit means to sequentially apply the output of said fine channel on the oscillation means and counter means and then the output of said coarse channel to said oscillation means and counter means.

7. A converter as claimed in claim 5, including an input side for coupling to a synchro or resolver, a demodulation reference for coupling to the power source of said synchro or resolver, and switch means responsive to said reference for activating said demodulator in synchronization with carrier frequency.

8. A converter as claimed in claim 7, including first logic means in said zero crossing detector for determining the phase of a zero crossing and second logic means for determining the quadrant thereof.

References Cited

UNITED STATES PATENTS

| | | | |
|---|---|---|---|
| 3,156,907 | 11/1964 | Lanning et al. | 340—198 |
| 3,242,478 | 3/1966 | Kaestner | 340—347 |
| 3,274,586 | 9/1966 | Lapinski | 340—347 |

MAYNARD R. WILBUR, *Primary Examiner.*

C. D. MILLER, *Assistant Examiner.*

U.S. Cl. X.R.

318—20